April 19, 1932.  W. PULZ  1,854,954

DUST REMOVER FOR THRESHING MACHINES

Filed Oct. 1, 1930

Patented Apr. 19, 1932

1,854,954

UNITED STATES PATENT OFFICE

WILLY PÜLZ, OF RASTATT, GERMANY

DUST-REMOVER FOR THRESHING-MACHINES

Application filed October 1, 1930, Serial No. 485,660, and in Germany October 9, 1929.

My invention relates to devices for removing the dust from the interior of the casing of threshing-machines, comprising a suction-box extending across the top and communicating with the interior of that part of the machine-casing which contains the straw-shaker, a plan sieve forming the bottom of said suction-box, and a suction-fan connected thereto at one end and withdrawing the dust-laden air from said part of the casing through said sieve and said suction-box. According to my invention within said suction-box and above said sieve there are disposed inclined air-guiding-surfaces rising from the end of the box adjacent to said fan toward the opposite end and provided with a series of openings and a series of jalousie-lugs adjacent thereto, said lugs having an inclination opposite to that of said guiding-surfaces, so that the suction-draft created by said fan will be distributed uniformly by said guiding-surfaces over the whole surface of said sieve, and the dust and air stream will be turned unconstrainedly by said jalousie-lugs into the direction of the suction-draft. By that means the suction-effect is increased considerably and formed uniformly on the whole sieve-surface, so that every means for mechanically cleaning the sieve, such as scrapers, brushes or the like, as well as devices for driving these means may be dispensed with.

Figure 1:
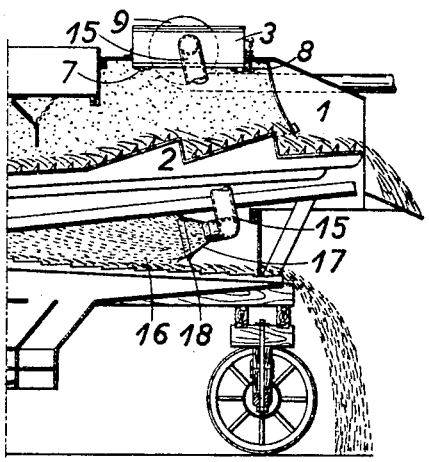
Figure 4:
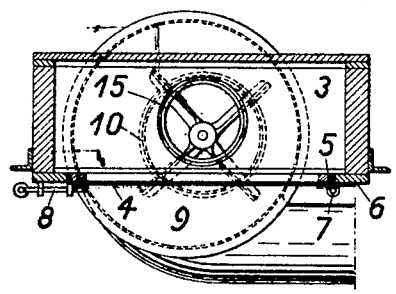
Figure 2:
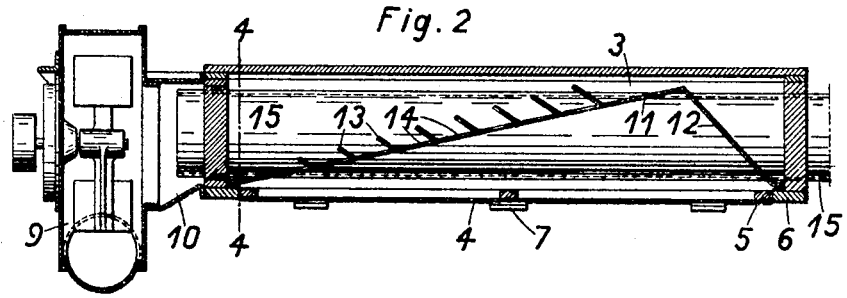
Figure 3:
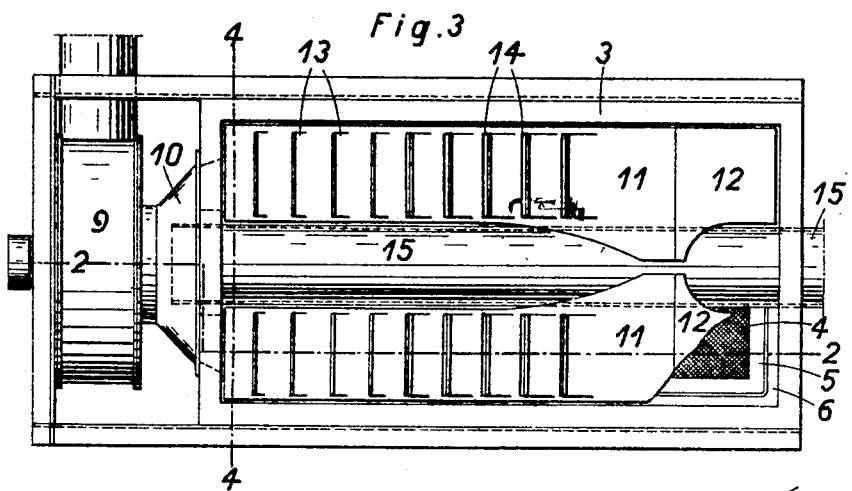

In the accompanying drawings which illustrates my invention and forms part of this specification, Figure 1 is a side view, partly in elevation and partly in section, showing the rear part of a threshing-machine equipped with my dust-remover, Figure 2 is an enlarged detail longitudinal section of my dust-remover taken on the line 2—2 of Fig. 3, Figure 3 is a plan view thereof, the top of the suction-box being removed, and Figure 4 is a transverse section thereof taken on the line 4—4 of Figs. 2 and 3.

Upon the top of the casing 1 (Fig. 1) of the threshing-machine containing the straw-shaker 2 there is mounted a wooden suction-box 3 of rectangular longitudinal and cross section, the bottom of which is formed by a plan or flat sieve 4 (Figs. 2 and 4). This suction-box extends across said casing from one side thereof to the other and above a corresponding opening provided in the top thereof, so that the interior of the casing 1 communicates with that of the box 3 through said opening, but is separated therefrom by the sieve 4. The latter is stretched upon an inner frame 5 which engages an outer frame 6 secured to the side walls of the box 3 and is connected thereto at one longitudinal side by means of a hinge 7 and at the opposite side by means of a locking-device 8. On one end-wall of the box 3 there is mounted externally a suction-fan 9 by means of its suction-socket 10, so that the interior of the fan-casing communicates with that of the box 3 through said socket and a corresponding opening provided in the end-wall of the box.

Within the latter and upon the frame 6 there are mounted two narrow shed-roof-shaped metal sheets 11, 12 extending at a certain distance from each other and adjacent to the longitudinal walls of the box from one end thereof to the other. The longer and less inclined part 11 of these sheets rises from the end of the box 3 adjacent to the fan 9 toward the opposite end, so that its distance from the sieve 4 increases in this direction, and is provided with a series of parallel rectangular jalousie-lugs 13 extending transversely of the box 3 and having an inclination opposite to that of the part 11, and with a series of slots 14 formed by stamping out partly said lugs off the sheet and thus corresponding to said lugs in size and shape.

The fan 9 is driven in any suitable manner from the driving power unit of the threshing-machine and creates a suction-draft withdrawing the dust-laden air from the interior of the casing 1 through the sieve 4 and the box 3. The guiding-surfaces formed by the part 11 of the sheets 11, 12 distribute this suction-draft uniformly over the whole surface of the sieve 4, and the lugs 13 turn the dust and air stream unconstrainedly into the direction of the suction-draft. The width of the sieve 4 and that of said opening in the top of the casing 1 in the longitudinal direction of the machine and the ratio of the free to the total surface of the sieve are determined so that a speed of the suction-draft is attained by which dust and other undesired admixtures can pass into the suction-stream, whilst larger pieces of straw are not withdrawn by the same. The width of said slots and said lugs in the longitudinal direction of the box 3 increase with the distance from the fan 9 in order to equalize the draft through all slots. When the locking-device 8 has been released, the frame 5 together with the sieve 4 may be turned downward about the hinge 7 and shaked in order to remove the particles adhering to the sieve.

The suction-socket 10 of the fan 9 is engaged by the end of a suction-pipe 15 extending between the two sheets 11, 12 through the box 3 and then downward externally of the casing 1 and into the short-straw-discharge 16 (Fig. 1), where it supports a muzzle 17. The mouth of the latter is turned to the air-stream existing in the discharge 16 and extends over the whole width and height of the free space above the short-straw, so that the muzzle governs the whole sectional area of this space. Thus the fan 9 withdraws also through the pipe 15 all the dust from the discharge 16. Preferably the muzzle 17 is made of thin sheet metal and provided with flanges 18 forming its mouth, so that by bending outward these flanges more or less the width and height of the mouth may be adjusted so as to fit exactly into the free space above the short-straw.

What I claim as my invention and desire to secure by Letters Patent is:

1. The combination with a threshing-machine, of a suction-box extending across the top and communicating with the interior of that part of the machine-casing which contains the straw-shaker, a plane sieve forming the bottom of said suction-box, a suction-fan connected to said suction-box at one end, and one or more inclined air-guiding-surfaces disposed within said suction-box and above said sieve, said guiding-surfaces rising from the end of said box adjacent to said fan toward the opposite end and being provided with a series of openings and a series of jalousie-lugs adjacent thereto, and said lugs having an inclination opposite to that of said guiding-surfaces.

2. The combination with a threshing-machine, of a suction-box extending across the top and communicating with the interior of that part of the machine-casing which contains the straw-shaker, a plane sieve forming the bottom of said suction-box, a suction-fan connected to said suction-box at one end, and angular metal sheets disposed within said suction-box and above said sieve, and having a long and short part, the said long part rising from the end of said box adjacent to said fan toward the opposite end and being provided with a series of slots and a series of corresponding jalousie-lugs adjacent thereto, and said short part and said lugs having an inclination opposite to that of said long part.

In testimony whereof I affix my signature.

Dr. WILLY PÜLZ.